Nov. 17, 1959 R. WILLIAMS 2,913,671
HIGH INPUT IMPEDANCE TRANSISTOR AMPLIFIER
Filed Jan. 22, 1957
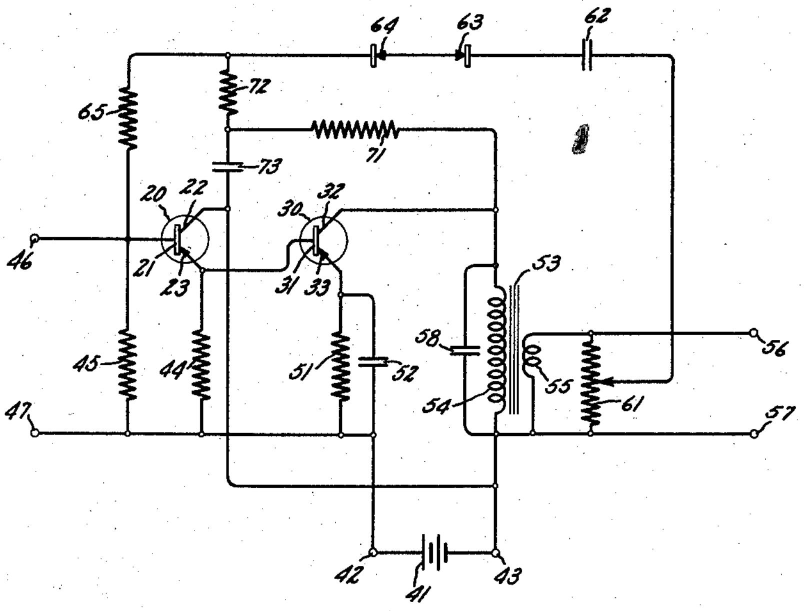
Inventor:
Reade Williams,
by Leonard J. Platt
His Attorney.

2,913,671
Patented Nov. 17, 1959

2,913,671

HIGH INPUT IMPEDANCE TRANSISTOR AMPLIFIER

Reade Williams, Framingham, Mass., assignor to General Electric Company, a corporation of New York Application January 22, 1957, Serial No. 635,494

3 Claims. (Cl. 331—50)

This invention relates to a synchronized electronic oscillator for powering a small alternating current motor, and more particularly, it relates to a battery operated transistor oscillator to power a clock motor.

In the copending application of T. Dreier and I. A. Terry, Serial No. 581,139, filed April 27, 1956, now patent No. 2,786,972 assigned to the same assignee as the present invention, there is disclosed a system for motivating clockworks which employs locally generated alternating power whose frequency is controlled by a synchronizing signal to operate a small synchronous motor at a predetermined rate of speed. The synchronizing signal, in turn, is derived from either an electric or a magnetic field produced by ordinary commercially supplied alternating power whose frequency, generally 60 cycles, is held relatively constant on the average by means of master horological control. In this way, highly accurate time indication is made possible without the necessity for a direct electrical connection to the clock.

According to one embodiment of the system disclosed in the aforementioned copending application, there is provided a battery operated low frequency oscillator to generate locally the power needed to run the motor, the oscillator frequency being effectively locked in at a predetermined value, ordinarily 60 cycles, by means of the received synchronizing signal. The present invention features an oscillator which is not only particularly well suited for this use but may be used to advantage in any application where it is required to synchronize natural oscillations with a synchronizing signal from an external source.

Briefly, according to the present invention, there is provided an improved feedback oscillator, that is, an improved oscillator of the type which comprises in essence an amplifying network and a feedback circuit to impress on the input of the amplifying network in addition to the external synchronizing signal, a portion of the signal voltage developed by the amplifier network itself. By tuning the amplifier network in a manner whereby the net phase shift through it and also through the feedback circuit is 360 degrees or some multiple thereof for the desired frequency of operation, natural oscillation of the amplifier is caused to take place at this frequency and any slight deviations therefrom will be counteracted by the injected synchronizing signal.

As is well known to those skilled in the art, however, the extent of deviations in the natural frequency of oscillation of the amplifying network or oscillator, in the absence of a synchronizing signal, may be considerably more than slight owing to changes in component characteristics in which case a conventional oscillator of this general type may become incapable of being synchronized by the external synchronizing signal. In other words, the amount of the difference between the natural frequency of oscillation and the frequency of the synchronizing signal may increase to the point where the pull-in range of the oscillator is exceeded for a given synchronizing signal amplitude. Uncontrolled changes in the amplitude of the synchronizing signal usually aggravate this condition by altering the pull-in characteristics of the oscillator.

Accordingly, in the improved oscillator of this invention there is provided a novel feedback circuit having a non-linear attenuation characteristic which, it has been found, not only enlarges the pull-in range of the oscillator to the end that synchronization with relatively small synchronizing signals may be effected, but which also tends to desensitize the oscillator to amplitude changes of the synchronizing signal. More particularly, a pair of germanium diodes are utilized as impedance elements in the feedback circuit of the invention to give the desired non-linear attenuation characteristic which causes variations in the signal derived from the output of the amplifying network to be reflected in lesser disproportionate variations in the signal as applied to the input. The preferred form of amplifying network utilized in conjunction with this feedback circuit is a two-stage transistor amplifier having a transformer coupled output circuit tuned to the desired frequency of oscillation; but it will be recognized by those skilled in the art that other forms of amplifying networks including vacuum tube amplifiers may also be used.

It is an object of the present invention, therefore, to provide an electronic feedback oscillator which is more amenable to being synchronized by an external synchronizing signal than hitherto known devices of the same general type.

The novel features of this invention together with further objects and advantages thereof will become more readily apparent when considered in connection with the accompanying drawing, wherein:

The sole figure is a schematic diagram of the oscillator in accordance with the present invention.

Referring to the drawing, it will be observed that the oscillator of the invention comprises in preferred form a pair of P-N-P junction transistors 20 and 30 (using the presently accepted terminology of the art), each having a base, a collector and emitter, designated 21, 22, 23, and 31, 32 and 33, respectively, and each being powered by the battery 41, having a positive terminal 42 and a negative terminal 43. Transistor 20 is arranged as an amplifier stage and to this end has its collector 22 connected to negative terminal 43 of battery 41, and its emitter 23 connected to positive terminal 42 of battery 41 through a load reistor 44. The input circuit of this stage comprises a resistor 45 connected between base 21 and battery terminal 42 and also between a pair of input terminals 46, 47 whereat the external synchronizing signal is applied.

In driven relation to the above-mentioned transistor amplifier stage is a second amplification stage formed with transistor 30. Transistor 30 has its base 31 connected to emitter 23 of transistor 20 and its emitter 33 connected to positive terminal 42 of the battery 41 through the parallel combination of a biasing resistor 51 and a signal bypass capacitor 52. The output from transistor 30 is taken from its collector circuit by means of an output circuit transformer 53 having a primary winding 54 and a secondary winding 55. Primary winding 54 is connected between collector 32 of transistor 30 and negative terminal 43; and secondary winding 55 is coupled across a pair of output load terminals 56 and 57. A capacitor 58 connected in parallel with primary winding 54 serves to tune the output circuit to the desired operating frequency.

Connected across output terminals 56 and 57 is an adjustable voltage dividing resistor 61 whose movable arm is returned to base 21 of transistor 20 through a coupling capacitor 62, a pair of oppositely (back to back) connected diodes, 63, 64, and a current limiting resistor 65, in series combination with one another. As will become apparent from the description of the operation of the oscillator, this last-mentioned circuit comprises the signal feedback circuit of the oscillator. Additionally, there is provided a negative D.C. (direct current) feedback circuit which comprises a pair of resistors 71 and 72 connected from the junction of diode 64 and resistor 65 to one leg of primary winding 54 as shown. A bypass capacitor 73 is provided between negative terminal 43 and the junction of resistors 71 and 72 so as to present a low impedance to the signal voltage thereacross.

The operation of the oscillator is featured by the non-linear attenuation characteristic provided in the feedback circuit by virtue of the non-linear impedance of diodes 63, 64. That is to say, should the signal voltage appearing across load terminals 56 and 57 vary due to a change in the amplitude of the synchronizing voltage, for example, a lesser disproportionate variation will occur in the portion of the signal fed back to the input circuit of the amplifying network, since the impedance of each diode will change in accordance with the amplitude of the signal applied thereto. If, for example, there is an increase in the amplitude of the signal derived from secondary winding 55, or more particularly from voltage divider 61, the impedance of each diode will also increase somewhat so that the signal transmitted by the feedback circuit will vary to a lesser degree. As mentioned heretofore, it has been found that in this way, the ability of the oscillator to lock-on or become synchronized with relatively small synchronizing signals is greatly improved.

Parenthetically, it will be observed that the D.C. negative feedback path through resistors 71 and 72 also tends to stabilize the oscillator frequency as well as prevent excessive current in the transistors by stabilizing the quiescent operating point of each amplifier stage. Assuming, for example, that the collector current in transistor 30 increases, a more positive potential will be impressed on the base of transistor 20 by this latter circuit, tending to decrease its collector current and hence, also the voltage drop across emitter resistor 44. As a result, the bias voltage on transistor 30 between base 31 and emitter 33 will become less negative thereby counteracting the initial increase in its collector current.

Although in the preferred embodiment of the invention illustrated, a pair of germanium diodes have been utilized as non-linear impedance elements, it has been determined that only a single diode need be used if the waveform of the output signal is not of particular concern. Of course, other altogether different types of non-linear impedance elements may also be used, germanium diodes having been chosen largely because of their simplicity and reliability.

While there has been shown and described a particular embodiment of this invention, it will be obvious to those skilled in the art that various other changes and modifications can be made therein without departing from the scope of the invention, and therefore, it is aimed in the appended claims to cover all such changes and modifications as fall within the true spirit and scope of the invention.

What I claim as new and desire to secure by Letters Patent of the United States is:

1. An electronic oscillator adapted to be synchronized by an external synchronizing signal of varying amplitude comprising an amplifier network having an input circuit to which the synchronizing signal is applied and an output circuit, an output transformer in said output circuit, said transformer having primary and secondary windings, a capacitive element connected across said primary winding to tune said output circuit to the desired frequency of oscillation, signal voltage dividing means to derive a portion of the signal voltage developed across said secondary winding, and a feedback circuit coupled between said voltage dividing means and said input circuit to produce natural oscillation of said amplifier network at said frequency, said feedback circuit including at least one germanium diode to cause in response to variations in the amplitude of the signal derived by said voltage dividing means, lesser disproportionate variations in the signal as applied to said input circuit thereby to facilitate synchronization of said natural oscillations by said synchronizing signal.

2. An electronic oscillator adapted to be synchronized by an external synchronizing signal of varying amplitude comprising an amplifier network having an input circuit to which the synchronizing signal is applied and an output circuit, an output transformer in said output circuit, said transformer having primary and secondary windings, signal voltage dividing means to derive a portion of the signal voltage developed across said secondary winding, and a feedback circuit coupled between said voltage dividing means and said input circuit to produce natural oscillation of said amplifier network at a desired frequency, said feedback circuit including a non-linear impedance to cause in response to variations in the amplitude of the signal derived by said voltage dividing means, lesser disproportionate variations in the signal as applied to said input circuit thereby to facilitate synchronization of said natural oscillations by said synchronizing signal.

3. An electronic oscillator adapted to be synchronized by an external synchronizing signal of varying amplitude comprising an amplifier network having an input circuit to which the synchronizing signal is applied and an output circuit, an output transformer in said output circuit, said transformer having primary and secondary windings, signal voltage dividing means to derive a portion of the singnal voltage developed across said secondary winding, and a feedback circuit coupled between said voltage dividing means and said input circuit to produce natural oscillation of said amplifier network at a desired frequency, said feedback circuit including at least one germanium diode to cause in response to variations in the amplitude of the signal derived by said voltage dividing means, lesser disproportionate variations in the signal as applied to said circuit thereby to facilitate synchronization of said natural oscillations by said synchronizing signal.

References Cited in the file of this patent

UNITED STATES PATENTS

| | | |
|---|---|---|
| 2,591,660 | Lindley et al. | Apr. 1, 1952 |
| 2,676,251 | Scarbrough | Apr. 20, 1954 |

FOREIGN PATENTS

| | | |
|---|---|---|
| 742,656 | Great Britain | Dec. 30, 1955 |